US010287395B2

(12) United States Patent
Kanda et al.

(10) Patent No.: US 10,287,395 B2
(45) Date of Patent: May 14, 2019

(54) POLYAMIDE RESIN AND METHOD FOR MANUFACTURING SAME

(71) Applicant: Lotte Advanced Materials Co., Ltd., Yeosu-si (KR)

(72) Inventors: Tomomichi Kanda, Yokohamashi (JP); Tomoaki Shimoda, Yokohamashi (JP)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/037,521

(22) PCT Filed: Nov. 21, 2014

(86) PCT No.: PCT/KR2014/011267
§ 371 (c)(1),
(2) Date: May 18, 2016

(87) PCT Pub. No.: WO2015/080436
PCT Pub. Date: Apr. 6, 2015

(65) Prior Publication Data
US 2016/0280856 A1   Sep. 29, 2016

(51) Int. Cl.
*C08G 69/08* (2006.01)
*C08G 69/30* (2006.01)
*C08G 69/26* (2006.01)
*C08G 69/28* (2006.01)

(52) U.S. Cl.
CPC ............ *C08G 69/30* (2013.01); *C08G 69/26* (2013.01); *C08G 69/265* (2013.01); *C08G 69/28* (2013.01)

(58) Field of Classification Search
CPC ...... C08L 77/00; C08L 77/06; C08G 18/3234
See application file for complete search history.

(56) References Cited

U.S. PATENT DOCUMENTS

| | | | |
|---|---|---|---|
| 2,172,374 A | 9/1939 | Flory | |
| 3,393,210 A | 7/1968 | Speck | |
| 3,842,045 A | 10/1974 | Campbell | |
| 5,360,891 A | 11/1994 | Wenzel | |
| 6,130,312 A | 10/2000 | Murakami et al. | |
| 6,169,161 B1 | 1/2001 | Tachibana et al. | |
| 6,534,623 B1 | 3/2003 | Gochanour | |
| 6,943,231 B2 | 9/2005 | Buhler | |
| 7,807,742 B2 | 10/2010 | Tanaka et al. | |
| 8,309,643 B2 | 11/2012 | Thullen et al. | |
| 9,023,975 B2 | 5/2015 | Nitto et al. | |
| 2003/0158308 A1 | 8/2003 | Nay et al. | |
| 2003/0171528 A1 | 9/2003 | Sakurai et al. | |
| 2003/0235666 A1* | 12/2003 | Buhler | C08G 69/265 428/35.7 |
| 2005/0272908 A1* | 12/2005 | Linemann | C08G 69/26 528/310 |
| 2012/0165466 A1 | 6/2012 | Nitto et al. | |
| 2013/0165621 A1* | 6/2013 | Kanda | C08F 2/36 528/193 |
| 2017/0002144 A1 | 1/2017 | Kanda et al. | |

FOREIGN PATENT DOCUMENTS

| | | |
|---|---|---|
| CA | 2055262 A | 5/1992 |
| CN | 1467236 A | 1/2004 |
| CN | 101195684 A | 6/2008 |
| CN | 101208390 A | 6/2008 |
| EP | 1369447 A1 | 12/2003 |
| JP | 04-268330 A | 9/1992 |
| JP | 07-070538 A | 3/1995 |
| JP | 08-311198 A | 11/1996 |
| JP | 11-343341 A | 12/1999 |
| JP | 2000-001544 A | 1/2000 |
| JP | 2004-051843 A | 2/2004 |
| JP | 2004-083817 A | 3/2004 |
| JP | 2004-083858 A | 3/2004 |
| JP | 2004-352833 A | 12/2004 |
| JP | 2004-536918 A | 12/2004 |
| JP | 2008-019440 A | 1/2008 |

(Continued)

OTHER PUBLICATIONS

International Search Report in counterpart International Application No. PCT/KR2014/011267 dated Mar. 9, 2015, pp. 1-6.
Office Action in counterpart Korean Application No. 10-2014-0158298 dated Jan. 19, 2017, pp. 1-7.
Office Action in counterpart Chinese Application No. 201480064712.8 dated Mar. 30, 2017, pp. 1-6.
Office Action in counterpart Japanese Application No. 2013-248226 dated May 30, 2017, pp. 1-7.
Search Report in counterpart European Patent Application No. 14865737.2 dated Jul. 12, 2017, pp. 1-7.
Office Action in commonly owned Japanese Patent Application No. 2013-248212 dated May 30, 2017, pp. 1-6.
International Search Report in commonly owned International Application No. PCT/KR2014/011288 dated Feb. 27, 2015, pp. 1-4.

(Continued)

*Primary Examiner* — Gregory Listvoyb
(74) *Attorney, Agent, or Firm* — Additon, Higgins & Pendleton, P.A.

(57) ABSTRACT

A method for manufacturing a polyamide resin, according to the present invention, comprises the steps of: obtaining a low-order condensate in a solid state through polycondensation of dicarboxylic acid and diamine in the presence of a compound having a wt % of approximately 0.01 to 0.5 with respect to the total amount of the dicarboxylic acid and the diamine; and solid-state polymerizing the low-order condensate, wherein the dicarboxylic acid contains, with respect to the total amount of the dicarboxylic acid, approximately 70 mol % of aliphatic dicarboxylic acid having 9 to 12 carbon atoms, wherein the diamine contains, with respect to the total amount of the diamine, approximately 50 mol % of diamine represented by previously indicated chemical formula 1, wherein the range of the maximum temperature of the polycondensation reaction is approximately 200 to 230° C., and the maximum reaction temperature of the solid-state polymerization is approximately 170 to 230° C.

18 Claims, No Drawings

(56) References Cited

FOREIGN PATENT DOCUMENTS

| | | | |
|---|---|---|---|
| JP | 2008-144170 A | | 6/2008 |
| JP | 2009-203422 A | | 9/2009 |
| JP | 5233482 | * | 12/2010 |
| JP | 2013-124285 A | | 6/2013 |
| JP | 2013-124287 A | | 6/2013 |
| JP | 2013-124288 A | | 6/2013 |
| KR | 10-1999-0082927 A | | 11/1999 |
| KR | 10-2008-0053198 A | | 6/2008 |
| KR | 10-2012-0040736 A | | 4/2012 |
| KR | 10-2013-0069386 A | | 6/2013 |
| KR | 10-2013-0069388 A | | 6/2013 |
| KR | 10-2013-0073773 A | | 7/2013 |
| WO | 2002/031022 A1 | | 4/2002 |
| WO | 2011-030742 A1 | | 3/2011 |
| WO | 2015/080436 A1 | | 6/2015 |
| WO | 2015/080438 A1 | | 6/2015 |

OTHER PUBLICATIONS

Search Report in commonly owned European Patent Application No. 14865066.6 dated Jul. 12, 2017, pp. 1-7.

Office Action in commonly owned Chinese Patent Application No. 201480074289.X dated Apr. 6, 2017, pp. 1-8.

Office Action in commonly owned Korean Application No. 10-2014-0156434 dated Jan. 19, 2017, pp. 1-4.

Office Action in commonly owned U.S. Appl. No. 15/039,467 dated Jan. 19, 2018, pp. 1-19.

Office Action in commonly owned Chinese Patent Application No. 201480074289.X dated Jul. 3, 2018, pp. 1-11.

"China Encyclopedia Chemistry I", p. 387, Feb. 28, 1989.

"Polymer Chemistry Experiment", Chengpei Wu, et al., pp. 109-113, Aug. 31, 1989.

"Engineering Plastics Handbook for Test Papers", p. 1326, Oct. 31, 2004.

* cited by examiner

POLYAMIDE RESIN AND METHOD FOR MANUFACTURING SAME

CROSS-REFERENCE TO RELATED APPLICATIONS

This application claims priority to and the benefit of International Application No. PCT/KR2014/011267, filed Nov. 21, 2014, which published as WO 2015/080436 on Jun. 4, 2015; Korean Patent Application No. 10-2014-0158298, filed in the Korean Intellectual Property Office on Nov. 13, 2014; and Japanese Patent Application No. 2013-248226, filed in the Japanese Patent Office on Nov. 29, 2013, the entire disclosure of each of which is incorporated herein by reference.

TECHNICAL FIELD

The present invention relates to a polyamide resin and a method of preparing the same. More particularly, the present invention relates to a technology for improving transparency of a polyamide resin.

BACKGROUND ART

With excellent properties and easy melt molding, polyamides are broadly applied to materials for clothes, fibers for industrial materials, engineering plastics, and the like. Recently, polyamides used in the field of transparent components for industrial devices, mechanical, electrical, electronic and automobile parts, and optical materials such as glasses or lenses are required to have further improved properties and functions. Particularly, there is a need for development of polyamides that have further improved properties in terms of transparency, color, and mechanical strength.

Generally, polyamide resins are prepared through polycondensation of a dicarboxylic acid and a diamine. For example, Patent Document 1 (JP2009-203422A) discloses a continuous preparation method of a polyamide resin, in which a dicarboxylic acid having a certain structure and a diamine are continuously supplied to a polymerization reactor to produce a low-order condensate (polyamide prepolymer), which in turn is continuously supplied to a twin-screw extruder to produce a resin having a high polymerization degree.

However, the polyamine resin prepared by the method disclosed in Patent Document 1 fails to exhibit sufficient levels of properties in terms of transparency, color and mechanical strength, and is thus required to be further improved.

The inventors of the present invention have conducted research to solve the problems as mentioned above. From the research, the inventors completed the present invention based on the finding that a polyamide resin prepared to have a high degree of polymerization through solid polymerization of a low-order condensate, prepared by polycondensation of a dicarboxylic acid having a certain structure and a diamine in the presence of a phosphorus compound, exhibited significant improvement in terms of various properties, particularly, transparency.

DISCLOSURE

Technical Problem

It is one object of the present invention to provide a polyamide resin that has excellent properties in terms of transparency, color and mechanical strength, particularly, high transparency.

It is another object of the present invention to provide a method of preparing a polyamide resin having excellent properties, particularly, high transparency.

The above and other objects of the present invention can be accomplished by the present invention described below.

Technical Solution

One aspect of the present invention relates to a method of preparing a polyamide resin. The preparation method includes preparing a low-order condensate in a solid phase through polycondensation of a dicarboxylic acid and a diamine in the presence of about 0.01 wt % to about 0.5 wt % of a phosphorus compound based on the total amount of the dicarboxylic acid and the diamine; and solid polymerizing the low-order condensate, wherein the dicarboxylic acid includes about 70 mol % or more of a $C_9$ to $C_{12}$ aliphatic dicarboxylic acid based on the total amount of the dicarboxylic acid, the diamine includes about 50 mol % or more of a diamine represented by Formula 1 based on the total amount of the diamine, the polycondensation is performed at a maximum temperature of about 200° C. to about 230° C., and the solid polymerization is performed at a maximum reaction temperature of about 170° C. to about 230° C.:

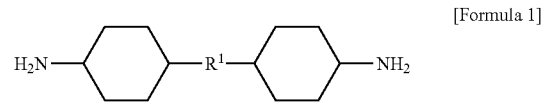

[Formula 1]

wherein $R^1$ is a $C_1$ to $C_3$ alkylene group.

In one embodiment, the polycondensation may be performed at a maximum reaction temperature of about 200° C. to about 220° C.

In one embodiment, the solid polymerizing may be performed at a maximum reaction temperature of about 170° C. to about 210° C.

In one embodiment, the phosphorus compound may include at least one selected from the group consisting of phosphorous acid, hypophosphorous acid, and salts thereof.

Another aspect of the present invention relates to a polyamide resin. The polyamide resin is prepared through polycondensation of a dicarboxylic acid and a diamine, and includes about 0.01 wt % to about 0.5 wt % of a phosphorus compound, wherein the dicarboxylic acid includes about 70 mol % or more of a $C_9$ to $C_{12}$ aliphatic dicarboxylic acid based on the total amount of the dicarboxylic acid, the diamine includes about 50 mol % or more of a diamine represented by Formula 1 based on the total amount of the diamine, and a 4 mm thick molded article produced using the polyamide resin has a total light transmission of about 85% or more and a yellowness index (YI) of about 5 or less:

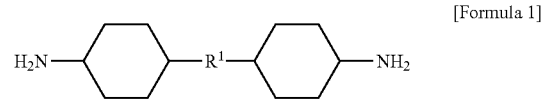

[Formula 1]

wherein $R^1$ is a $C_1$ to $C_3$ alkylene group.

In one embodiment, the diamine may include about 70 mol % or more of the diamine represented by Formula 1 based on the total amount of the diamine.

In one embodiment, the dicarboxylic acid may include at least one of an alicyclic dicarboxylic acid and an aromatic dicarboxylic acid, and may include about 70 mol % to less than about 100 mol % of the $C_9$ to $C_{12}$ aliphatic dicarboxylic acid and higher than 0 mol % to about 30 mol % of the at least one of the alicyclic dicarboxylic acid and the aromatic dicarboxylic acid.

In one embodiment, the polyamide resin may have an inherent viscosity (IV) of about 0.6 dL/g to about 1.5 dL/g as measured at 25° C. and at a concentration of 0.5 g/dL in concentrated sulfuric acid.

In one embodiment, the aliphatic dicarboxylic acid may include at least one of sebacic acid and dodecanedioic acid.

In one embodiment, the at least one of the alicyclic dicarboxylic acid and the aromatic dicarboxylic acid may include at least one selected from the group consisting of 1,4-cyclohexanedicarboxylic acid, terephthalic acid, and isophthalic acid.

In one embodiment, the phosphorus compound may include at least one selected from the group consisting of phosphorous acid, hypophosphorous acid, and salts thereof.

Advantageous Effects

The present invention provides a polyamide resin that exhibits excellent properties, particularly, high transparency.

BEST MODE

Hereinafter, embodiments of the present invention will be described in more detail.

<Method of Producing Polyamide Resin>

A method of preparing a polyamide resin according to one embodiment of the invention includes two polymerization processes, that is, (1) a process of preparing a low-order condensate in a solid phase through polycondensation of a dicarboxylic acid and a diamine in the presence of about 0.01 wt % to about 0.5 wt % of a phosphorus compound based on the total amount of the dicarboxylic acid and the diamine (hereinafter, referred to as "Process (1)"), and (2) a process of solid polymerizing the low-order condensate (hereinafter, referred to as "Process (2)"). The polycondensation may be performed at a maximum reaction temperature of about 200° C. to about 230° C. and the solid polymerization may be performed at a maximum reaction temperature of about 170° C. to about 230° C. The polycondensation and the solid polymerization may be performed at a maximum reaction temperature of about 200° C. to about 230° C.

A polyamide resin prepared by this method exhibits better properties (transparency, color and mechanical strength), particularly, better transparency than typical polyamide resins in the related art. Properties of the polyamide resin are closely related to a crystal structure of a polycondensate (polyamide). The polyamide resin can have a completely amorphous structure or a crystalline structure depending upon structures of monomers thereof or a preparation method thereof, and a crystalline polyamide resin can exhibit various crystalline properties depending upon degree of crystallinity, rate of crystallization, and crystal size.

In one embodiment, the dicarboxylic acid having a specific structure and the diamine described in detail below are used as monomers, so that the low-order condensate can exhibit crystallinity and a molded product produced by melting a polyamide having a high degree of polymerization can have a fine crystal structure or an amorphous structure. As a result, the polyamide having a high degree of polymerization is obtained in a solid phase through solid polymerization of the crystallized low-order condensate, and a product having high transparency can be obtained through melt molding of the polyamide. With regard to improvement in transparency, it is assumed that the amorphous structure or the fine crystal structure has a smaller size than wavelengths of light and thus makes light absorption or light scattering difficult. In addition, upon polycondensation for preparation of the low-order condensate, a predetermined amount of a phosphorus compound is added in order to further improve transparency of the polyamide resin finally obtained.

Hereinafter, each process of the method of preparing a polyamide resin according to the present invention will be described.

Process (1)

In this process, a low-order condensate is obtained in a solid phase through polycondensation of the dicarboxylic acid and the diamine is performed.

The dicarboxylic acid essentially contains a $C_9$ to $C_{12}$ aliphatic dicarboxylic acid. The $C_9$ to $C_{12}$ aliphatic dicarboxylic acid may include any one of an acyclic aliphatic dicarboxylic acid and a cyclic aliphatic dicarboxylic acid (alicyclic dicarboxylic acid), and when the $C_9$ to $C_{12}$ aliphatic dicarboxylic acid is an acyclic aliphatic dicarboxylic acid, the $C_9$ to $C_{12}$ aliphatic dicarboxylic acid may include any one of a linear aliphatic dicarboxylic acid and a branched aliphatic dicarboxylic acid.

Examples of the linear aliphatic dicarboxylic acid may include nonanedioic acid (azelaic acid), decanedioic acid (sebacic acid), undecanedioic acid, dodecanedioic acid, and the like. Preferably, at least one of sebacic acid and dodecanedioic acid is used.

Examples of the branched aliphatic dicarboxylic acid may include trimethyl adipic acid, 1,6-decanedicarboxylic acid, and the like.

Examples of the cyclic aliphatic dicarboxylic acid (alicyclic dicarboxylic acid) may include 2-methyl-1,4-cyclohexanedicarboxylic acid, 2,3-dimethyl-1,4-cyclohexanedicarboxylic acid, 2,5-dimethyl-1,4-cyclohexanedicarboxylic acid, 2,6-dimethyl-1,4-cyclohexanedicarboxylic acid, and the like.

Preferably, the acyclic aliphatic dicarboxylic acid, more preferably, the linear aliphatic dicarboxylic acid is used. The $C_9$ to $C_{12}$ aliphatic dicarboxylic acid can improve crystallinity of the polyamide low-order condensate, and the properties of the polyamide resin (transparency, color and mechanical strength), particularly, transparency thereof. In addition, these $C_9$ to $C_{12}$ aliphatic dicarboxylic acids may be used alone or in combination thereof.

The $C_9$ to $C_{12}$ aliphatic dicarboxylic acid may be present in an amount of about 70 mol % or more, about 80 mol % or more, about 90 mol % or more, about 95 mol % or more, about 98 mol % or more, or about 100 mol %, based on the total amount of the dicarboxylic acid. Within this content range of the $C_9$ to $C_{12}$ aliphatic dicarboxylic acid, the polyamide low-order condensate can have improved crystallinity and the polyamide resin can exhibit improved properties (transparency, color and mechanical strength), particularly, improved transparency.

The dicarboxylic acid may include other dicarboxylic acids excluding the $C_9$ to $C_{12}$ aliphatic dicarboxylic acid. The other dicarboxylic acids may include a cyclic (alicyclic) or acyclic aliphatic carboxylic acid and an aromatic carboxylic acid, without being limited thereto. Examples of the dicarboxylic acid excluding the $C_9$ to $C_{12}$ aliphatic dicarboxylic acid may include terephthalic acid, malonic acid, dimethyl malonic acid, succinic acid, glutaric acid, adipic acid, 2-methyl adipic acid, pimelic acid, 2,2-dimethyl glutaric acid, 3,3-diethyl succinic acid, suberic acid, 1,3-cyclopentanedicarboxylic acid, 1,4-cyclohexanedicarboxylic acid, isophthalic acid, 2,6-naphthalenedicarboxylic acid, 2,7-naphthalenedicarboxylic acid, 1,4-naphthalenedicarboxylic acid, 1,4-phenylenedioxydiacetaic acid, 1,3-phenylenedioxydiacetaic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like. These dicarboxylic acids may be used alone or in combination thereof. In some embodiments, polyvalent carboxylic acid components such as trimellitic acid, trimesic acid and pyromellitic acid may be used together in a small amount, as needed.

Particularly, in terms of property balance between high transparency, mechanical strength and thermal resistance, the dicarboxylic acid may include at least one of an alicyclic dicarboxylic acid and an aromatic carboxylic acid. For example, terephthalic acid, 1,4-cyclohexanedicarboxylic acid and isophthalic acid may be used alone or in combination thereof. When the dicarboxylic acid includes at least one of the alicyclic dicarboxylic acid and the aromatic carboxylic acid, the at least one of the alicyclic dicarboxylic acid and the aromatic carboxylic acid may be present in an amount of greater than about 0 mol % to about 30 mol % or less, for example, about 5 mol % to about 20 mol %. In this embodiment, the $C_9$ to $C_{12}$ aliphatic dicarboxylic acid may be present in an amount of about 70 mol % to less than about 100 mol %, for example, about 80 mol % to about 95 mol %.

The diamine essentially contains a diamine represented by Formula 1:

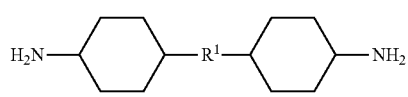

[Formula 1]

wherein $R^1$ is a $C_1$ to $C_3$ alkylene group.

Examples of the $C_1$ to $C_3$ alkylene group may include a methylene group (—$CH_3$—), an ethylene group (—$CH_2CH_2$—), a trimethylene group (—$CH_2CH_2CH_2$—), a propylene group (—$CH(CH_3)CH_2$—), an isopropylidene group (—$C(CH_3)_2$—), and a propylidene group (—$CH(CH_2CH_3)$—). Thereamong, the $C_1$ to $C_3$ alkylene group is preferably a linear alkylene group. Specifically the $C_1$ to $C_3$ alkylene group may be a methylene group, an ethylene group, or a trimethylene group. With the diamine represented by Formula 1, the polyamide low-order condensate has improved crystallinity and the polyamide resin can exhibit improved properties (transparency, color and mechanical strength), particularly, improved transparency. Further, the diamine represented by Formula 1 may be used alone or in combination thereof.

The diamine represented by Formula 1 may be present in an amount of about 50 mol % or more, about 70 mol % or more, about 90 mol % or more, about 95 mol % or more, about 98 mol % or more, or about 100 mol % or more, based on the total amount of the diamine. Within this content range of the diamine represented by Formula 1, the polyamide low-order condensate has improved crystallinity and the polyamide resin can exhibit improved properties (transparency, color and mechanical strength), particularly, improved transparency.

In this process, the diamine may include other diamine components excluding the diamine represented by Formula 1. The other diamine components may include a cyclic or acyclic aliphatic diamine oran aromatic diamine, without being limited thereto. Examples of the other diamine components may include ethylenediamine, propanediamine, 1,4-butanediamine, 1,6-hexanediamine (hexamethylenediamine), 1,7-heptanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, 5-methyl-1,9-nonanediamine, cyclohexanediamine, methylcyclohexylhexanediamine, isophoronediamine, 1,3-bisaminomethylcyclohexane, 1,4-bisaminomethylcyclohexane, 4,4'-diamino-3,3'-dimethyldicyclohexylmethane, norbonanedimethaneamine, tricyclodecanedimethaneamine, p-phenylenediamine, m-phenylenediamine, 4,4'-diaminodiphenylsulfone, 4,4'-diaminodiphenyl ether, metaxylylenediamine, paraxylylenediamine, and the like. These diamine components may be used alone or in combination thereof.

The low-order condensate may be prepared by placing an aqueous solution of the monomers or salts thereof in, for example, a typical pressurized polymerization bath, and subjecting the same to polycondensation in an aqueous solvent while stirring.

The aqueous solvent refers to a solvent that contains water as a main component. Usable solvents besides water are not particularly limited so long as the solvents do not influence polycondensation reactivity or solubility, and may include, for example, alcohols such as methanol, ethanol, propanol, butanol, ethylene glycol, and the like.

The moisture content in a reaction system upon initiation of polycondensation may be set to be in the range of about 10 wt % to about 35 wt % upon completion of polycondensation, preferably 20 wt % to about 60 wt %. With the moisture content of about 20 wt % or more, a substantially homogeneous solution can be obtained upon initiation of polycondensation. In addition, with the moisture content of about 60 wt % or less, it is possible to reduce time and energy in distillation and removal of moisture upon polycondensation while suppressing thermal degradation of the low-order condensate through reduction in reaction time.

In this polycondensation process, a phosphorus compound is used. Any phosphorus compound can be used without limitation. Examples of the phosphorus compound may include phosphoric acid, phosphorous acid, hypophosphorous acid, phosphate, phosphite, hypophosphite, phosphate ester, polymetaphosphates, polyphosphates, phosphine oxides, phosphonium halogen compounds, and the like. In other embodiments, in order to reduce solid polymerization temperature and reaction time while improving the color and transparency of the polyamide resin, the phosphorus compound may include at least one selected from the group consisting of phosphoric acid, phosphorous acid, hypophosphorous acid, and salts thereof, for example, from the group consisting of phosphorous acid, hypophosphorous acid, and salts thereof.

Examples of the phosphate may include sodium phosphate, potassium phosphate, potassium dihydrogen phosphate, calcium phosphate, vanadium phosphate, magnesium phosphate, manganese phosphate, lead phosphate, nickel phosphate, cobalt phosphate, ammonium phosphate, diammonium hydrogen phosphate, and the like.

Examples of the phosphite may include potassium phosphite, sodium phosphite, calcium phosphite, magnesium phosphite, manganese phosphite, nickel phosphite, cobalt phosphite, and the like.

Examples of the hypophosphite may include sodium hypophosphite, potassium hypophosphite, calcium hypophosphite, magnesium hypophosphite, aluminum hypophosphite, vanadium hypophosphite, manganese hypophosphite, zinc hypophosphite, lead hypophosphite, nickel hypophosphite, cobalt hypophosphite, ammonium hypophosphite, and the like.

The phosphate ester may include, for example, monomethyl phosphate ester, dimethyl phosphate ester, trimethyl phosphate, monoethyl phosphate ester, diethyl phosphate ester, triethyl phosphate, propyl phosphate ester, dipropyl phosphate ester, tripropyl phosphate, isopropyl phosphate ester, diisopropyl phosphate ester, triisopropyl phosphate, butyl phosphate ester, dibutyl phosphate ester, tributyl phosphate, isobutyl phosphate ester, diisobutyl phosphate ester, triisobutyl phosphate, hexyl phosphate ester, dihexyl phosphate ester, trihexyl phosphate, octyl phosphate ester, dioctyl phosphate ester, trioctyl phosphate, 2-ethylhexyl phosphate ester, di(2-ethylhexyl) phosphate ester, tri(2-ethylhexyl) phosphate, decyl phosphate ester, didecyl phosphate ester, tridecyl phosphate, isodecyl phosphate ester, diisodecyl phosphate ester, triisodecyl phosphate, stearyl phosphate ester, distearyl phosphate ester, tristearyl phosphate, monophenyl phosphate ester, diphenyl phosphate ester, triphenyl phosphate, ethyloctadecyl phosphate, and the like.

Examples of the polymetaphosphates may include sodium trimetaphosphate, sodium pentametaphosphate, sodium hexametaphosphate, polymetaphosphate, and the like.

The polyphosphoric acid may include, for example, sodium tetrapolyphosphate.

The phosphine oxide may include, for example, hexamethyl phosphoramide. These phosphorus compounds may be provided in the form of hydrates.

Preferably, the phosphorus compound may be sodium hypophosphite or a hydrate thereof, or sodium phosphite or a hydrate thereof.

These phosphorus compounds may be used alone or in combination thereof.

The phosphorus compound may be present in an amount of about 0.01 wt % to about 0.5 wt %, based on the total amount of the dicarboxylic acid and the diamine. If the amount of the phosphorus compound is less than about 0.01 wt %, there is a problem of reduction in solid polymerization temperature and it is difficult to achieve reduction in reaction time and improvement in color and transparency of the polyamide resin. If the amount of the phosphorus compound exceeds about 0.5 wt %, the phosphorus compound is precipitated in the polyamide resin, thereby causing degradation of transparency, or a decomposition gas is generated, thereby causing poor external appearance such as silver mark. The phosphorus compound may be present in an amount of about 0.01 wt % to about 0.2 wt %, or about 0.01 wt % to about 0.15 wt %.

In addition, polycondensation may be performed in the presence of an end capping agent. The end capping agent allows easy control of the molecular weight of the low-order condensate while improving melt stability of the low-order condensate. The end capping agents are not particularly limited so long as the end capping agents are mono-functional compounds having reactivity with a terminal amino group or a terminal carboxyl group, and examples of the end capping agents may include monocarboxylic acids, monoamines, acid anhydrides such as anhydrous phthalic acid and the like, monoisocyanate, monoacid halides, monoesters, and monoalcohols, without being limited thereto. Preferably, monocarboxylic acids or monoamines may be used in terms of reactivity and stability of end capping. More preferably, monocarboxylic acids may be used for easy handling.

As the end capping agent, any monocarboxylic acids can be used without limitation so long as the monocarboxylic acids are reactive with an amino group, and examples of the monocarboxylic acids may include aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexane carboxylic acid; aromatic monocarboxylic acids such as benzoic acid, toluic acid, α-naphthalene carboxylic acid, β-naphthalene carboxylic acid, methyl-naphthalene carboxylic acid, phenylacetic acid, and the like; and mixtures thereof. Specifically, acetic acid, propionic acid, butyric acid, valeric acid, caproic acid, caprylic acid, lauric acid, tridecylic acid, myristic acid, palmitic acid, stearic acid, and benzoic acid may be used given reactivity, stability of end capping, price, and the like.

As the end capping agent, any monoamine can be used without limitation so long as the monoamines have reactivity with a carboxylic group. Examples of the monoamines may include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine, and dicyclohexylamine; aromatic monoamines such as aniline, toluidine, diphenyl amine, and naphthylamine; and mixtures thereof. Specifically, butylamine, hexylamine, octylamine, decylamine, stearylamine, cyclohexylamine and aniline may be used given reactivity, melting point, stability of end capping, price, and the like.

Although the amount of the end capping agent used in preparation of the low-order condensate may depend on reactivity and melting point, reaction apparatus, reaction conditions of the end capping agents, and the like, the end capping agent may be typically present in an amount of about 0.1 mol % to about 15 mol % relative to the total mole number of the dicarboxylic acid or the diamine.

Preparation of the low-order condensate may be performed at elevated temperature and pressure while stirring the reactants. The polymerization temperature may be controlled after introducing the raw materials. In addition, the polymerization pressure may be controlled depending on the progress of polymerization.

In this process, the polycondensation may be performed at a maximum reaction temperature of about 200° C. to about 230° C. If the maximum reaction temperature is less than about 200° C., the obtained low-order condensate can have a significantly low degree of polycondensation, thereby causing problems such as adhesion and coloring upon solid polymerization. If the maximum reaction temperature exceeds about 230° C., the polyamide can suffer from deterioration in color and transparency due to thermal history of the reaction process. The maximum reaction temperature of the polycondensation may range, for example, from about 200° C. to about 220° C.

On the other hand, the maximum reaction temperature is not necessarily reached at the point at which polycondensation is completed and may be reached at any time before completion of polycondensation. As such, polycondensation may be performed under milder conditions than typical melt polymerization, thereby securing a high degree of polymerization in solid polymerization while maintaining the crystal structure of the low-order condensate. As a result, the obtained polyamide resin can have improved properties (transparency, color, mechanical strength), particularly, high transparency.

In this process, the reaction pressure may range about 1.0 MPa to about 3.5 MPa, for example, from about 1.0 MPa to about 3.0 MPa. Under the condition that the reaction pressure is set to about 1.0 MPa or more, the temperature or moisture content in a reaction system can be easily controlled during polycondensation in which a large amount of water is removed by distillation. In addition, since it is possible to prevent the moisture content of the low-order condensate from being reduced or to prevent the low-order condensate from being solidified due to evaporation latent heat of water, the low-order condensate can be easily discharged. Further, under the condition that the reaction pressure is set to about 3.5 MPa or less, since it is possible to use a reactor having low pressure resistance, the polyamide resin can be prepared without increasing production costs. Further, the moisture content in the reaction system can be lowered, thereby increasing the degree of polymerization of the low-order condensate.

In this process, the reaction time may range from about 0.5 hours to about 4 hours, for example, from about 1 hour to about 3 hours. Herein, the reaction time refers to a period of time from a time point of reaching the reaction temperature to initiation of an operation of discharging the low-order condensate. Under the condition that the reaction pressure is set to about 0.5 hours or more, reaction can reach sufficient reaction rate, whereby unreacted materials do not remain in the system and a homogeneous low-order condensate can be obtained. Under the condition that the reaction pressure is set to about 4 hours or less, it is possible to prevent the low-order condensate from suffering excessive thermal history, and the degree of polymerization is not further increased even by extending the reaction time above this range.

In this process, the moisture content in the reaction system upon completion of reaction of the low-order condensate may range from about 15 wt % to about 35 wt %, for example, from about 20 wt % to about 35 wt %. Herein, the expression "upon completion of reaction" refers to a time point when the low-order condensate has a certain degree of polymerization to initiate an operation of discharging the low-order condensate, and the moisture content includes water of condensation prepared during reaction. The moisture content to be introduced into the reaction system may be adjusted given the amount of water of condensation to be prepared, or a predetermined amount of water may be distilled off or removed upon adjustment of the reaction pressure in a reactor equipped with a condenser and a pressure control valve. When the moisture content in the reaction system upon completion of reaction is about 15 wt % or more, precipitation or solidification of the low-order condensate substantially does not occur in the reaction system, whereby discharge of the low-order condensate can be easily performed. In addition, when the moisture content in the reaction system upon completion of reaction is about 35 wt % or less, a low-order condensate having a sufficient degree of polymerization can be obtained. Further, the discharge rate can be enhanced due to low moisture content to be separated by evaporation and a need for a drying process before solid state polymerization can be eliminated, thereby improving preparation efficiency.

In this process, in order to obtain the low-order condensate, polycondensation may be performed in a batch mode or in a continuous mode. Further, polycondensation for producing the low-order condensate is preferably performed under stirring in order to inhibit adhesion of the low-order condensate to a reaction chamber while securing uniform polymerization.

The low-order condensate obtained by this process may have a heat of fusion of about 10 J/g or more, for example, about 15 J/g or more, for example, about 20 J/g or more, as measured by a differential scanning calorimeter (DSC). A method of measuring the heat of fusion using the differential scanning calorimeter (DSC) will be described in detail in Examples set forth below. Under the condition that the heat of fusion is set to about 10 J/g or more, the low-order condensate can be effectively polymerized while preventing uneven heating caused by fusion under solid polymerization conditions, whereby the polyamide resin can have improved properties (transparency, color and mechanical strength), particularly, improved transparency. The heat of fusion of the low-order condensate can be adjusted by adjusting the kinds of monomers used in preparation of the polyamide resin or by crystallization of the low-order condensate. For example, the heat of fusion of the low-order condensate can be increased by increasing the ratio of the $C_9$ to $C_{12}$ aliphatic dicarboxylic acid to the total amount of the dicarboxylic acid, or the ratio of the diamine represented by Formula 1 to the total amount of the diamine while adjusting the temperature, moisture content, and discharge rate of the low-order condensate upon discharge of a polymerized solution of the low-order condensate from the reactor such that the low-order condensate can be discharged in a crystallized solid phase. In some embodiments, the heat of fusion of the low-order condensate can be adjusted by heating the discharged low-order condensate at a temperature higher than or equal to the glass transition temperature thereof and less than or equal to a solid polymerization temperature, as needed.

The low-order condensate obtained by this process may have an inherent viscosity (IV) of about 0.1 dL/g to about 0.4 dL/g, for example, about 0.1 dL/g to about 0.3 dL/g, for example, about 0.15 dL/g to about 0.3 dL/g, as measured at 25° C. and at a concentration of 0.5 g/dL in concentrated sulfuric acid. A method of measuring the inherent viscosity (IV) will be described in Examples set forth below. When the inherent viscosity (IV) is about 0.1 dL/g or more, materials having low melting points such as the monomers and salts of the monomers, particularly, the low-order condensate, do not remain, and thus fusion or adhesion of resin powder to the reactor upon solid polymerization can be prevented. When the inherent viscosity (IV) is about 0.40 dL/g or less, it is possible to prevent precipitation or solidification of the low-order condensate in the reaction system, thereby allowing the low-order condensate to be easily discharged. The inherent viscosity (IV) can be controlled by adjusting the kinds or mixing ratio of monomers in preparation of the polyamide resin, or by adjusting conditions for polycondensation (solvent amount (moisture content), reaction temperature, reaction time). For example, even under the same conditions in terms of the kinds of monomers and the mixing ratios of the monomers, the inherent viscosity (IV) can be increased by decreasing the solvent amount (moisture content), by increasing the reaction temperature, or by extending the reaction time.

The process may further include a salt adjustment process and/or an enrichment process prior to polymerization of the low-order condensate, as needed. The salt adjustment process refers to generation of salts from the dicarboxylic acid component and the diamine component. The salt adjustment process may be regulated to pH±0.5 of a neutralization point of the salts, for example, topH±0.3 of a neutralization point of the salts. In the enrichment process, the raw materials may be enriched to have a concentration of about +2 wt % to about +90 wt %, for example, about +5 wt % to about +80 wt %. The enrichment process may be performed at about 90° C. to about 220° C., or at about 100° C. to about 210° C., specifically at about 130° C. to about 200° C. The enrichment process is preferably performed at about 0.1 MPa to about 2.0 MPa. Typically, the pressure of the enrichment process is controlled to be not more than the polymerization pressure. In order to promote the enrichment process, forced discharge by, for example, a nitrogen stream may be performed. The enrichment process is effective in reduction of polymerization time.

After the polycondensation process, the method of preparing a polyamide resin may further include discharging the low-order condensate, followed by cooling. Discharging the low-order condensate from the reaction chamber is performed under atmospheric pressure or less in an inert gas atmosphere. The process of discharging does not require a pressure vessel controlled to a specific pressure and separate supply of steam into the reaction chamber during removal of the low-order condensate from the reaction chamber. In addition, it is possible to obtain the low-order condensate through a simple and effective manner in the form of non-foam powder particles (powder or granules) exhibiting low thermal degradation, sufficiently high inherent viscosity, and high bulk density.

The inert gas atmosphere preferably has an oxygen concentration of about 1% by volume or less in order to inhibit oxidative degradation of the low-order condensate.

The discharge rate of the low-order condensate from the reaction chamber may be suitably adjusted depending upon the size of the reaction chamber, the amount of material in the reaction chamber, temperature, the size of a discharge outlet, the length of a nozzle, and the like. For example, discharge of the low-order condensate may be performed such that the discharge rate per cross-sectional area of the discharge outlet is about 2,000 $kg/s/m^2$ to about 20,000 $kg/s/m^2$. Within this range, since the obtained low-order condensate has a bulk density of, for example, about 0.35 $g/cm^3$ to about 0.8 $g/cm^3$, collapse, aggregation, and fusion to a reactor wall can thus be prevented or do not occur during solid polymerization described below, handling properties are good, and a large amount of low-order condensate can be supplied into a polymerization apparatus, thereby improving volume efficiency of the apparatus employed in solid polymerization.

Further, the low-order condensate discharged from the reaction chamber exhibits almost no thermal or oxidative degradation since the temperature of the low-order condensate is preferably rapidly decreased to about 100° C. or less due to latent heat of vaporization when discharged.

Furthermore, since the low-order condensate discharged from the reaction chamber vaporizes most moisture by latent heat thereof, this process allows cooling and drying of the low-order condensate to be performed simultaneously. Discharge under inert gas atmosphere such as nitrogen and the like or under pressure below atmospheric pressure is preferred since efficiency of drying and cooling can be improved. In addition, a cyclone type solid-gas separation apparatus may be used as a discharge container in order to improve efficiency of drying and cooling by preventing powder scattering upon discharge while enabling discharge at a high linear gas velocity.

The low-order condensate may be subjected to compacting or crude milling in order to obtain further increased bulk density or a uniform particle diameter, as needed.

The solid phase low-order condensate obtained as above is provided in crystal form, has a sufficiently high inherent viscosity and a low residual amount of unreacted materials, and thus allows solid polymerization at high temperature without causing adhesion or aggregation between the low-order condensate particles. Further, the low-order condensate suffers from little deterioration due to side reaction.

Process (2)

In this process, the low-order condensate obtained in Process (1) is subjected to solid polymerization to obtain a polyamide resin.

Solid polymerization may be performed subsequent to discharge of the low-order condensate from the reaction chamber; after drying the low-order condensate discharged from the reaction chamber; after storing the low-order condensate discharged from the reaction chamber; or after subjecting the low-order condensate discharged from the reaction chamber to compacting or crude milling. When the low-order condensate is subjected to solid polymerization, that is, high degree polymerization, it is possible to obtain a polyamide resin that suffers from little thermal degradation.

The low-order condensate may be subjected to solid polymerization by any suitable method under any suitable conditions without limitation so long as high degree polymerization can be performed while maintaining a solid state without causing any fusion, aggregation and deterioration of the low-order condensate.

In order to prevent oxidative degradation of the low-order condensate and the resulting polyamide, solid polymerization may be performed in in an atmosphere of an inert gas such as helium gas, argon gas, nitrogen gas, and carbon dioxide gas or under a reduced pressure.

Solid polymerization may be performed at a maximum reaction temperature of about 170° C. to about 230° C. If the maximum reaction temperature is less than about 170° C., it is difficult to obtain a polyamide resin having a sufficiently high degree of polycondensation. If the maximum reaction temperature exceeds about 230° C., the polyamide can suffer from deterioration in color or transparency due to adhesion or coloring upon solid polymerization. The maximum reaction temperature of the solid polymerization may range, for example, from about 170° C. to about 210° C.

Further, the maximum reaction temperature is not necessarily reached at the point at which solid polymerization is completed and may be reached at any time before completion of solid polymerization. As such, solid polymerization may be performed under milder conditions than typical solid polymerization, thereby securing a high degree of polymerization while maintaining the crystal structure of the low-order condensate. As a result, the obtained polyamide resin has improved properties (transparency, color and mechanical strength), particularly, improved transparency.

As an apparatus for solid polymerization employed in this process, any known apparatus may be used without limitation. Examples of the apparatus for solid polymerization may include uniaxial disks, kneaders, twin axial paddles, a vertical tower type apparatus, a vertical tower type device, a rotatory drum type or double cone type solid polymerization apparatus, a drying device, and the like.

Although not particularly limited, solid polymerization may be performed for about 1 hour to about 20 hours. During solid polymerization, the low-order condensate may be stirred mechanically or by gas stream.

In the method of preparing a polyamide resin according to the present invention, various fiber materials such as glass fibers and carbon fibers, additives such as inorganic powder fillers, organic powder fillers, coloring agents, UV absorbers, light stabilizers, antioxidants, antistatic agents, flame retardants, crystallization accelerators, plasticizers, lubricants, and other polymers may be added in the process of preparing a low-order condensate, in the process of solid polymerization, or in an optional stage after solid polymerization.

<Polyamide Resin>

The polyamide resin prepared by the method according to the present invention exhibits excellent properties (transparency, color and mechanical strength), particularly, high transparency. Accordingly, a novel polyamide resin exhibiting these properties also falls within the scope of the present invention.

That is, a polyamide resin according to another embodiment of the present invention may be prepared by polycondensation of a dicarboxylic acid and a diamine, and includes about 0.01 wt % to about 0.5 wt % of a phosphorus compound, wherein the dicarboxylic acid includes about 70 mol % or more of a $C_9$ to $C_{12}$ aliphatic dicarboxylic acid based on the total amount of the dicarboxylic acid, the diamine includes about 50 mol % or more of a diamine represented by Formula 1 based on the total amount of the diamine:

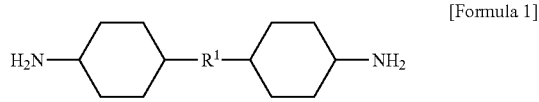

[Formula 1]

wherein R1 is a $C_1$ to $C_3$ alkylene group.

The polyamide resin according to another embodiment of the present invention may have a total light transmission of about 85% or more and a yellowness index (YI) of about 5 or less on a 4 mm thick molded article produced using the polyamide resin.

The polyamide resin may have a total light transmission of about 85% or more, or about 86% or more, or about 87% or more on 4 mm thick molded article produced using the polyamide resin. A method of measuring the total light transmission will be described in detail in Examples set forth below.

The polyamide resin may have a yellowness index (YI) of about 5 or less, for example, about 4 or less, before molding.

The polyamide resin may have a yellowness index (YI) of about 5 or less, for example, about 4 or less, for example, about 3 or less on the 4 mm thick molded article produced using the polyamide resin. A method of measuring the yellowness index (YI) will be described in detail in Examples set forth below.

The polyamide resin may include about 0.01 wt % to about 0.5 wt % of the phosphorus compound, for example, about 0.01 wt % to about 0.2 wt % of the phosphorus compound. The concentration of the phosphorus compound can be measured using an inductively coupled plasma atomic emission spectroscopy (ICP-AES), more specifically, by a method described in Examples set forth below.

In the polyamide resin, the phosphorus compound may include at least one selected from the group consisting of phosphorous acid, hypophosphorous acid, and salts thereof.

In the polyamide resin, the diamine may include about 70 mol % or more of the diamine represented by Formula 1.

In the polyamide resin, the dicarboxylic acid may include at least one of an alicyclic dicarboxylic acid and an aromatic dicarboxylic acid, and may include about 70 mol % to less than about 100 mol % of the $C_9$ to $C_{12}$ aliphatic dicarboxylic acid and higher than 0 mol % to about 30 mol % of the at least one of the alicyclic dicarboxylic acid and the aromatic dicarboxylic acid.

In the polyamide resin, the aliphatic dicarboxylic acid may include at least one of sebacic acid and dodecanedioic acid.

In the polyamide resin, the at least one of the alicyclic dicarboxylic acid and the aromatic dicarboxylic acid may include at least one selected from the group consisting of 1,4-cyclohexanedicarboxylic acid, terephthalic acid, and isophthalic acid.

The polyamide resin may have an inherent viscosity (IV) of about 0.6 dL/g to about 1.5 dL/g, for example, about 0.7 dL/g to about 1.3 dL/g, as measured at 25° C. and at a concentration of 0.5 g/dL in concentrated sulfuric acid. Within this range, the polyamide resin exhibits sufficient mechanical strength and good flowability and thus can produce a molded article having good color and transparency without excessively increasing the temperature upon molding.

The polyamide resin may have a glass transition temperature of about 120° C. or more, for example, about 125° C. or more. A method of measuring the glass transition temperature will be described in detail in Examples set forth below.

The polyamide resin may have impact strength after an injection molding (Izod impact test) of about 8 $kJ/m^2$ or more, for example, about 9 $kJ/m^2$ or more. A method of measuring the impact strength will be described in detail in Examples set forth below.

The polyamide resin may have a terminal amino group concentration ([$NH_2$]) of about 20 μmol/g to about 100 μmol/g, for example, about 30 μmol/g to about 80 μmol/g. If the terminal amino group concentration of the polyamide resin is less than about 20 μmol/g, the polyamide resin can suffer from degradation of heat-resistant color stability in thermal history since polycondensation is performed at high temperature for the purpose of improving reactivity of the polycondensation. If the terminal amino group concentration of the polyamide resin exceeds about 100 μmol/g, the terminal amino group can be easily colored, thereby causing degradation of heat-resistant color stability (discoloration resistance under heating conditions). Accordingly, the polyamide resin having a terminal amino group concentration within the above range exhibits good heat-resistant color stability. The terminal amino group concentration can be measured by a suitable method, more specifically, by a method disclosed in the description of examples.

The polyamide resin may have a terminal carboxylic group concentration ([COOH]) of about 20 μmol/g to about 250 μmol/g, for example, about 30 μmol/g to about 200 μmol/g. If the terminal carboxylic group concentration of the polyamide resin is less than about 20 μmol/g, the polyamide resin can suffer from degradation of heat-resistant color stability in thermal history since polycondensation is performed at high temperature for the purpose of improving reactivity of the polycondensation. If the terminal carboxylic group concentration of the polyamide resin exceeds about 250 μmol/g, it can be difficult to obtain a desired molding material due to an insufficiently high degree of polymerization of the polyamide resin. Accordingly, the polyamide resin having a terminal carboxylic group concentration within the above range exhibits good heat-resistant color stability. The terminal carboxylic group concentration can be measured by a suitable method, more specifically, by a method disclosed in the description of examples.

With such good properties (transparency, color, mechanical strength), the polyamide resin can be suitably used in the field of transparent components for industrial devices, mechanical, electrical, electronic and automobile parts, and optical materials such as glasses or lenses.

MODE FOR INVENTION

Examples

Next, the present invention will be described in more detail with reference to some examples. It should be understood that these examples are provided for illustration only and are not to be construed in any way as limiting the invention. Measurement of inherent viscosity (IV), terminal amino group concentration, terminal carboxylic group concentration, melting point, glass transition temperature, crystallization temperature and color, preparation of specimens, and property evaluation were performed as follows.

(1) Inherent Viscosity

A specimen solution was prepared by dissolving a specimen at a concentration of 0.5 g/dL in 96% concentrated sulfuric acid. Flow seconds of each of the 96% concentrated sulfuric acid (blank) and the specimen solutions were measured using an Ubbelohde viscometer at 25° C. and the inherent viscosity was calculated according to Equation 1.

$$\eta_{inh} = \ln(\eta_{rel})/c \quad \text{[Equation 1]}$$

$\eta_{rel}$: t1/t0
t1: flow seconds of the specimen
t0: flow seconds of the blank
c: concentration of the solution (g/dL)

(2) Terminal Amino Group Concentration ([$NH_2$])

0.5 g of a specimen was dissolved in 8 ml of hexafluoroisopropanol while stirring at room temperature (25° C.). After completion of dissolution, 30 ml of phenol/ethanol (80 vol %/20 vol %) was added to the resulting solution and stirred for 5 minutes. Thereafter, the resulting solution was subjected to neutralization titration with 0.1N HCl solution and the end point was determined through measurement of potential difference.

(3) Terminal Carboxylic Group Concentration ([COOH])

0.3 g to 0.5 g of a specimen was accurately weighed and was dissolved in 20 ml of ortho-cresol by heating at 170° C. while stirring in a nitrogen atmosphere. After completion of dissolution, the resulting solution was cooled, followed by adding 15 ml of benzyl alcohol and stirring for 5 minutes. The resulting solution was subjected to neutralization titration with 0.1N HCl (methanolic) solution and the end point was determined through measurement of potential difference.

(4) Measurement of Phosphorus Compound Concentration in Resin

Measurement instrument: 720-ES (ICP-AES Agilent Technology)

For pretreatment of a specimen, sulfuric acid was added to the specimen weighed in a crucible, followed by heating and ash treatment. Ash content was dissolved in potassium hydrogen sulfate, dissolved in dilute nitric acid, and treated to have a constant volume in pure water. For qualitative analysis, a calibration curve was obtained using a phosphorus compound solution having a predetermined concentration.

(5) Melting Point, Glass Transition Temperature, Crystallization Temperature, Heat of Fusion A DSC available from Seiko Instruments Korea Inc. and a sample obtained by drying at 90° C. in a vacuum for 12 hours was used in measurement of the low-order condensate. In measurement of the polyamide resin, a non-crystallized sample, which was obtained by heating the polyamide resin to 300° C. or to a temperature 10° C. higher than the melting point thereof in a nitrogen atmosphere, followed by quenching, was heated from 30° C. to 300° C. at a temperature increase rate of 10° C./min and at a flow rate of 10 ml/min in a nitrogen atmosphere, maintained for 5 minutes, and cooled to 100° C. at a temperature decrease rate of 10° C./min to measure the glass transition temperature of the sample. Here, an endothermic peak temperature in the course of temperature elevation was measured as the melting point, and an exothermic peak temperature through crystallization in the course of temperature decrease was measured as the crystallization temperature. Furthermore, the heat of fusion was calculated from a peak area of the endothermic peak.

(6) Color (Polyamide Resin Before Molding)

Color of a sample was measured using a compact color/whiteness meter (NW-11, Nippon Denshoku Industries Co., Ltd).

Illumination/Light reception conditions: 45° annular illumination, 0° light reception Measurement method: Diffraction grating, post-spectroscopy Measurement area: 10 mmφ, Light source: Pulse Xenon lamp Standard illuminant/Observation condition: D65/10°

Measurement item: Yellowness index (YI)

(7) Preparation of Injection-Molded Specimen

A rectangular specimen (80 mm×10 mm×4.0 mm) was prepared under the following conditions using an injection molding machine SE18DUZ (Sumitomo Heavy Industries, Ltd).

[Molding Conditions]
Molding temperature: 300° C. to 350° C.
Mold temperature: 40° C. to 50° C.
Injection pressure: 120 MPa to 140 MPa
Injection speed: 30 mm/sec
Screw RPM: 150 rpm
Cooling time: 40 seconds (8) Property Evaluation of Injection-Molded Specimen (8-1) Total Light Transmission Total light transmission was measured using HAZE-GARD II (Toyo Seikiseisakusho Co., Ltd.) in accordance with ASTM D1003.

(8-2) Impact Strength (Izod Impact Test)

Impact strength was measured under the following conditions in accordance with JIS K7110: 1999.

Injection-molded specimen: 1A type (80×10×4 mm A notch)
Test conditions: Hitting direction edgewise
Nominal pendulum energy 0.5 J
Test temperature 23° C.
Measurement number n=5 (average value)
Tester: Digital impact tester DG-UB type (Toyo Seikiseisakusho Co., Ltd.).

(8-3) Color

As in (6) color measurement, a color of an injection-molded sample was measured using a compact color/whiteness meter (NW-11, Nippon Denshoku Industries Co., Ltd). In measurement, a standard white board (X:Y:Z=92.3:97.4:104.5) was placed behind the injection molded molding having a thickness of 4 mm.

Example 1

In a 1 L autoclave reactor equipped with a partial condenser, a pressure control valve and a bottom discharge valve, 194.42 g (0.844 mol) of dodecanedioic acid, 177.58 g (0.844 mol) of [bis(4-aminocyclohexyl)methane] (PACM), 0.372 g of sodium hypophosphite·1 hydrate (0.1 wt % based on the total weight of the charged raw materials), and 248 g of distilled water (40 wt % based on the total weight of the charged raw materials) was placed and purged with nitrogen. The temperature of the reactor was increased to 130° C. for 0.5 hours while stirring the raw materials, and maintained for 0.5 hours. Then, the inner temperature was increased to 210° C. for 1 hour and maintained. After the inner pressure reached 1.5 MPa, 185 g of water was removed through distillation in order to maintain the pressure and reaction was continued for 1.0 hour with the pressure valve completely closed.

After a certain period of reaction time, the prepared low-order condensate was discharged to a container through the bottom discharge valve at room temperature (25° C.) under a nitrogen atmosphere and atmospheric pressure while maintaining the temperature of the reaction bath and the moisture content (21 wt %) in a reaction system, thereby providing white low-order condensate powder.

The obtained low-order condensate had an inherent viscosity (IV) of 0.14 and exhibited a DSC endothermic peak at 240° C. and crystallinity with a heat of fusion of 47 J/g.

Then, 300 g of the obtained low-order condensate was supplied into a 1,000 mL round bottom flask, which in turn was placed in a rotary evaporator equipped with an oil bath. After flushing with nitrogen, the flask was dipped in the oil bath while being rotated under supply of nitrogen at a flow rate of 1 L/min. The inner temperature of the oil bath was increased to 130° C. for 0.5 hours, maintained for 0.5 hours, increased to 205° C. for 1 hour, followed by solid polymerization at this temperature for 4 hours. After a certain period of reaction time, the inner temperature of the flask was lowered to room temperature (25° C.), thereby obtaining a highly polymerized polyamide.

The obtained polyamide resin had an IV of 0.87, a glass transition temperature of 137° C. as measured by DSC, a melting point of 249° C. and a YI of 2.1, did not have a crystallization temperature, and included 0.105 wt % of the phosphorus compound. The obtained polyamide resin had a sufficiently high degree of polymerization and exhibited a good color.

An injection-molded specimen was prepared using the obtained polyamide resin at a barrel temperature of 305° C. and a mold temperature of 45° C. The injection-molded specimen had a total light transmission of 89.1%, a YI of 2.3, and an impact strength of 10.5 kJ/m². The injection-molded specimen exhibited high transparency and strength, and good external appearance and color without suffering from pitting caused by filling failure, silver mark caused by generation of moisture and gas, sticking or inclusion of gels, and discoloration such as a yellowing phenomenon.

Example 2

Preparation and evaluation of a polyamide resin and an injection-molded specimen were performed in the same manner as in Example 1 except that 182.34 g (0.902 mol) of sebacic acid and 189.66 g (0.902 mol) of [bis(4-aminocyclohexyl)methane] (PACM) were used as raw materials and 190 g of water was removed through distillation upon polymerization of the low-order condensate.

The low-order condensate had an IV of 0.15 and exhibited a DSC endothermic peak at 258° C. and crystallinity with a heat of fusion of 42 J/g.

The polyamide resin had an IV of 0.91, a glass transition temperature of 143° C., a melting point of 283° C., a crystallization temperature of 200° C. and a YI of 2.0, and included 0.102 wt % of the phosphorus compound. The obtained polyamide resin exhibited a good color and a sufficiently high degree of polymerization.

The injection-molded specimen had a total light transmission of 89.0%, a YI of 2.1, and an impact strength of 10.5 kJ/m². The injection-molded specimen had good external appearance with high transparency and good color, and high mechanical strength.

Example 3

Preparation and evaluation of a polyamide resin and an injection-molded specimen were performed in the same manner as in Example 2 except that 177.56 g (0.771 mol=90 mol %) of dodecanedioic acid, 14.23 g (0.086 mol=10 mol %) of terephthalic acid, and 180.21 g (0.857 mol) of bis(4-aminocyclohexyl)methane] (PACM) were used as raw materials and solid polymerization was performed for 5 hours.

The low-order condensate had an IV of 0.14 and exhibited a DSC endothermic peak at 256° C. and crystallinity with a heat of fusion of 18 J/g.

The polyamide resin had an IV of 0.88, a glass transition temperature of 144° C., a melting point of 245° C., a crystallization temperature of 193° C. and a YI of 2.3, and included 0.101 wt % of the phosphorus compound. The obtained polyamide resin exhibited a good color and a sufficiently high degree of polymerization.

The injection-molded specimen had a total light transmission of 89.4%, a YI of 2.5, and an impact strength of 10.8 kJ/m². The injection-molded specimen had good external appearance with high transparency and good color, and high mechanical strength.

Example 4

Preparation and evaluation of a polyamide resin and an injection-molded specimen were performed in the same manner as in Example 3 except that 142.31 g (0.618 mol=70 mol %) of dodecanedioic acid, 44.00 g (0.265 mol=30 mol %) of terephthalic acid, and 185.69 g (0.883 mol) of bis(4-aminocyclohexyl)methane] (PACM) were used as raw materials.

The low-order condensate had an IV of 0.13 and exhibited a DSC endothermic peak at 252° C. and crystallinity with a heat of fusion of 22 J/g.

The polyamide resin had an IV of 0.84 and a glass transition temperature of 150° C., and did not have a melting point and a crystallization temperature. The polyamide resin had a YI of 3.3 and included 0.102 wt % of the phosphorus compound. The obtained polyamide resin exhibited a good color and a sufficiently high degree of polymerization.

The injection-molded specimen had a total light transmission of 86.2%, a YI of 4.5, and an impact strength of 9.5 kJ/m². The injection-molded specimen had good external appearance with high transparency and good color, and high mechanical strength.

Example 5

Preparation and evaluation of a polyamide resin and an injection-molded specimen were performed in the same manner as in Example 1 except that 177.31 g (0.770 mol=90 mol %) of dodecanedioic acid, 14.73 g (0.086 mol=10 mol %) of 1,4-cyclohexanedicarboxylic acid (1,4-CHDA), and 179.96 g (0.855 mol) of bis(4-aminocyclohexyl)methane] (PACM) were used as raw materials and solid polymerization was performed for 5 hours.

The low-order condensate had an IV of 0.15 and exhibited a DSC endothermic peak at 248° C. and crystallinity with a heat of fusion of 32 J/g.

The polyamide resin had an IV of 0.90, a glass transition temperature of 141° C., a melting point of 246° C., a crystallization temperature of 212° C. and a YI of 2.0, and included 0.104 wt % of the phosphorus compound. The obtained polyamide resin exhibited a good color and a sufficiently high degree of polymerization.

The injection-molded specimen had a total light transmission of 89.4%, a YI of 2.5, and an impact strength of 10.7 kJ/m². The injection-molded specimen had good external appearance with high transparency and good color, and high mechanical strength.

Example 6

Preparation and evaluation of a polyamide resin and an injection-molded specimen were performed in the same manner as in Example 1 except that 190.77 g (0.828 mol) of dodecanedioic acid, 121.98 g (0.580 mol=70 mol %) of [bis(4-aminocyclohexyl)methane] (PACM), and 59.25 g (0.249 mol=30 mol %) of MACM[4,4'-diamino-3,3'-dimethyldicyclohexylmethane] were used as raw materials.

The low-order condensate had an IV of 0.15 and exhibited a DSC endothermic peak at 251° C. and crystallinity with a heat of fusion of 28 J/g.

The polyamide resin had an IV of 0.87, a glass transition temperature of 133° C. and a melting point of 242° C., and did not have a crystallization temperature. The polyamide resin had a YI of 2.4 and included 0.105 wt % of the phosphorus compound. The obtained polyamide resin exhibited a good color and a sufficiently high degree of polymerization.

The injection-molded specimen had a total light transmission of 88.8%, a YI of 2.6, and an impact strength of 10.5 kJ/m². The injection-molded specimen had good external appearance with high transparency and good color, and high mechanical strength.

Example 7

Preparation and evaluation of a polyamide resin and an injection-molded specimen were performed in the same manner as in Example 1 except that 188.42 g (0.818 mol) of dodecanedioic acid, 86.05 g (0.409 mol=50 mol %) of [bis(4-aminocyclohexyl)methane] (PACM), and 97.53 g (0.409 mol=50 mol %) of MACM[4,4'-diamino-3,3'-dimethyldicyclohexylmethane] were used as raw materials.

The low-order condensate had an IV of 0.14 and exhibited a DSC endothermic peak at 255° C. and crystallinity with a heat of fusion of 7 J/g.

The polyamide resin had an IV of 0.80 and a glass transition temperature of 135° C., and did not have a crystallization temperature. The polyamide resin had a YI of 6.5 and included 0.107 wt % of the phosphorus compound. The obtained polyamide resin exhibited a good color and a sufficiently high degree of polymerization.

The injection-molded specimen had a total light transmission of 86.2%, a YI of 4.6, and an impact strength of 10.8 kJ/m². The injection-molded specimen had good external appearance with high transparency and good color, and high mechanical strength.

Example 8

Preparation and evaluation of a polyamide resin and an injection-molded specimen were performed in the same manner as in Example 1 except that the reaction temperature and the reaction pressure of the low-order condensate were set to 230° C. and 2.2 MPa, respectively.

The low-order condensate had an IV of 0.22 and exhibited a DSC endothermic peak at 256° C. and crystallinity with a heat of fusion of 36 J/g.

The polyamide resin had an IV of 1.15, a glass transition temperature of 135° C., a melting point of 250° C., a crystallization temperature of 190° C. The polyamide resin had a YI of 3.9 and included 0.103 wt % of the phosphorus compound. The obtained polyamide resin exhibited a good color and a sufficiently high degree of polymerization.

The injection-molded specimen had a total light transmission of 86.7%, a YI of 4.8, and an impact strength of 10.8 kJ/m². The injection-molded specimen had good external appearance with high transparency and good color, and high mechanical strength.

Example 9

Preparation and evaluation of a polyamide resin and an injection-molded specimen were performed in the same manner as in Example 1 except that the reaction temperature for solid polymerization was set to 215° C.

The low-order condensate had an IV of 0.15 and exhibited a DSC endothermic peak at 242° C. and crystallinity with a heat of fusion of 42 J/g.

The polyamide resin had an IV of 1.02, a glass transition temperature of 134° C., a melting point of 255° C., a crystallization temperature of 198° C. The polyamide resin had a YI of 4.2 and included 0.106 wt % of the phosphorus compound. The obtained polyamide resin exhibited a good color and a sufficiently high degree of polymerization.

The injection-molded specimen had a total light transmission of 86.5%, a YI of 4.8, and an impact strength of 10.8 kJ/m². The injection-molded specimen had good external appearance with high transparency and good color, and high mechanical strength.

Example 10

Preparation and evaluation of a polyamide resin and an injection-molded specimen were performed in the same manner as in Example 1 except that 0.186 g of sodium hypophosphite•1 hydrate (0.05 wt % based on the total weight of the charged raw materials) was used.

The low-order condensate had an IV of 0.14 and exhibited a DSC endothermic peak at 241° C. and crystallinity with a heat of fusion of 45 J/g.

The polyamide resin had an IV of 0.88, a glass transition temperature of 136° C. and a melting point of 250° C., and did not have a crystallization temperature. The polyamide resin had a YI of 2.1 and included 0.049 wt % of the phosphorus compound. The obtained polyamide resin exhibited a good color and a sufficiently high degree of polymerization.

The injection-molded specimen had a total light transmission of 89.4%, a YI of 1.9, and an impact strength of 10.7 kJ/m². The injection-molded specimen had good external appearance with high transparency and good color, and high mechanical strength.

Example 11

Preparation and evaluation of a polyamide resin and an injection-molded specimen were performed in the same manner as in Example 1 except that 0.093 g of sodium hypophosphite•1 hydrate (0.025 wt % based on the total weight of the charged raw materials) was used.

The low-order condensate had an IV of 0.14 and exhibited a DSC endothermic peak at 240° C. and crystallinity with a heat of fusion of 43 J/g.

The polyamide resin had an IV of 0.90, a glass transition temperature of 135° C. and a melting point of 249° C., and did not have a crystallization temperature. The polyamide resin had a YI of 2.3 and included 0.025 wt % of the phosphorus compound. The obtained polyamide resin exhibited a good color and a sufficiently high degree of polymerization.

The injection-molded specimen had a total light transmission of 89.5%, a YI of 2.3, and an impact strength of 10.8 kJ/m$^2$. The injection-molded specimen had good external appearance with high transparency and good color, and high mechanical strength.

Example 12

Preparation and evaluation of a polyamide resin and an injection-molded specimen were performed in the same manner as in Example 1 except that the reaction temperature and reaction time for solid polymerization were set to 180° C. and 6 hours, respectively.

The polyamide resin had an IV of 0.85, a glass transition temperature of 135° C. and a melting point of 250° C., and did not have a crystallization temperature. The polyamide resin had a YI of 2.0 and included 0.102 wt % of the phosphorus compound. The obtained polyamide resin exhibited a good color and a sufficiently high degree of polymerization.

The injection-molded specimen had a total light transmission of 89.2%, a YI of 2.0, and an impact strength of 10.0 kJ/m$^2$. The injection-molded specimen had good external appearance with high transparency and good color, and high mechanical strength.

Comparative Example 1

Preparation and evaluation of a polyamide resin and an injection-molded specimen were performed in the same manner as in Example 1 except that 0.018 g of sodium hypophosphite•1 hydrate (0.005 wt % based on the total weight of the charged raw materials) was used.

The low-order condensate had an IV of 0.13 and exhibited a DSC endothermic peak at 240° C. and crystallinity with a heat of fusion of 45 J/g.

The polyamide resin had an IV of 1.86, a glass transition temperature of 135° C., a melting point of 248° C., a crystallization temperature of 201° C. The polyamide resin had a YI of 5.6 and included 0.004 wt % of the phosphorus compound. The obtained polyamide resin exhibited a good color and a sufficiently high degree of polymerization.

The injection-molded specimen had a total light transmission of 84.8%, a YI of 7.2, and an impact strength of 10.1 kJ/m$^2$. Although the injection-molded specimen exhibited good mechanical strength, the injection-molded specimen had low transparency and an unpleasant color as compared with the polyamide resin according to the present invention.

Comparative Example 2

Preparation and evaluation of a polyamide resin and an injection-molded specimen were performed in the same manner as in Example 1 except that 152.49 g (1.043 mol) of adipic acid and 219.51 g (1.043 mol) of [bis(4-aminocyclohexyl)methane] (PACM) were used as raw materials and 196 g of water was removed through distillation.

The low-order condensate had an IV of 0.17 and exhibited unclear endothermic and exothermic behavior at a temperature of 300° C. or more in DSC measurement.

The polyamide resin had an IV of 0.82, a glass transition temperature of 165° C., a melting point of 352° C., a crystallization temperature of 310° C., and a YI of 2.6. Although the polyamide resin exhibited a good color and a sufficiently high degree of polymerization, the polyamide resin has an excessively high melting point and thus, an injection-molded specimen could not be obtained using the polyamide resin due to generation of decomposition gas and reduction in viscosity upon injection molding after melting.

Comparative Example 3

Preparation and evaluation of a polyamide resin and an injection-molded specimen were performed in the same manner as in Example 3 except that 123.86 g (0.538 mol=60 mol %) of dodecanedioic acid and 59.57 g (0.359 mol=40 mol %) of [bis(4-aminocyclohexyl)methane] (PACM) were used as raw materials.

The low-order condensate had an IV of 0.12 and did not have a DSC endothermic peak.

The polyamide resin had an IV of 0.72, a glass transition temperature of 155° C., and did not have a melting point and a crystallization temperature. The polyamide resin had a YI of 6.5. It was confirmed that the polyamide resin tended to be colored due to adhesion of the resin upon solid polymerization.

The injection-molded specimen had a total light transmission of 81.9%, a YI of 7.6, and an impact strength of 6.7 kJ/m$^2$. The injection-molded specimen had low transparency, an unpleasant color, and low impact strength.

Comparative Example 4

Preparation and evaluation of a polyamide resin and an injection-molded specimen were performed in the same manner as in Example 3 except that 123.15 g (0.535 mol=60 mol %) of dodecanedioic acid, 61.38 g (0.356 mol=40 mol %) of 1,4-cyclohexanedicarboxylic acid (1,4-CHDA), and 188.47 g (0.891 mol) of bis(4-aminocyclohexyl)methane] (PACM) were used as raw materials.

The low-order condensate had an IV of 0.17 and exhibited unclear endothermic and exothermic behavior at a temperature of 300° C. or more in DSC measurement.

The polyamide resin had an IV of 0.79, a glass transition temperature of 154° C., a melting point of 355° C., a crystallization temperature of 318° C., and a YI of 2.8. Although the polyamide resin exhibited a good color and a sufficiently high degree of polymerization, the polyamide resin has an excessively high melting point and thus, an injection-molded specimen could not be obtained using the polyamide resin due to generation of decomposition gas and reduction in viscosity upon injection molding after melting.

Comparative Example 5

Preparation and evaluation of a polyamide resin and an injection-molded specimen were performed in the same manner as in Example 6 except that 187.26 g (0.813 mol) of dodecanedioic acid, 68.42 g (0.325 mol=40 mol %) of bis(4-aminocyclohexyl)methane] (PACM) and 116.32 g (0.488 mol=60 mol %) of MACM[4,4'-diamino-3,3'-dimethyldicyclohexylmethane] were used as raw materials.

The low-order condensate had an IV of 0.12 and did not have a DSC endothermic peak. The polyamide resin had an IV of 0.73, a glass transition temperature of 133° C., and did not have a melting point and a crystallization temperature. The polyamide resin had a YI of 8.8, and it was confirmed that the polyamide resin tended to be colored due to adhesion of the resin upon solid polymerization.

The injection-molded specimen had a total light transmission of 82.4%, a YI of 8.1, and an impact strength of 5.5 kJ/m². The injection-molded specimen had low transparency, an unpleasant color, and low impact strength.

Comparative Example 6

As in Example 1, after polycondensation of a low-order condensate at 210° C., the temperature of the mixture was increased to 300° C. while reducing the reaction pressure to atmospheric pressure for 1 hour. After the temperature of the mixture was maintained at 300° C. for 30 minutes, the mixture was moved from the reaction bath to a water bath, followed by cooling, pulverization and drying.

The obtained polyamide resin had an IV of 1.06, a glass transition temperature of 134° C. and a melting point of 257° C., and did not have the crystallization temperature. The polyamide resin had a YI of 5.2 and exhibited a sufficiently high degree of polymerization and a slight yellow color.

The injection-molded specimen had a total light transmission of 84.5%, a YI of 5.8, and an impact strength of 9.9 kJ/m². The injection-molded specimen had low transparency and an unpleasant color as compared with the polyamide resin according to the present invention.

Results are shown in Tables 1 and 2.

TABLE 1

| | | Example 1 | Example 2 | Example 3 | Example 4 | Example 5 | Example 6 |
|---|---|---|---|---|---|---|---|
| Composition ratio (mol %) | PACM | 100 | 100 | 100 | 100 | 100 | 70 |
| | MACM | | | | | | 30 |
| | 1,12-dodecanedioic acid | 100 | | 90 | 70 | 90 | 100 |
| | 1,10-decanedioic acid | | 100 | | | | |
| | Terephthalic acid | | | 10 | 30 | | |
| | 1,4-CHDA | | | | | 10 | |
| | Adipic acid | | | | | | |
| Phosphorus compound (injection amount) | sodium hypophosphite-1 hydrate | 0.100 | 0.100 | 0.100 | 0.100 | 0.100 | 0.100 |
| Low-order condensate | Polymerization Temp. (° C.) | 210 | 210 | 210 | 210 | 210 | 210 |
| | Pressure (MPa) | 1.5 | 1.5 | 1.5 | 1.5 | 1.5 | 1.5 |
| | IV (dL/g) | 0.14 | 0.15 | 0.14 | 0.13 | 0.15 | 0.15 |
| | Melting Temp (° C.) | 240 | 258 | 256 | 252 | 248 | 251 |
| | Heat of fusion (J/g) | 47 | 42 | 18 | 22 | 32 | 28 |
| Polyamide resin | SSP Temp. (° C.) | 205 | 205 | 208 | 208 | 205 | 205 |
| | SSP time (h) | 4 | 4 | 5 | 5 | 5 | 4 |
| | IV (dL/g) | 0.87 | 0.91 | 0.88 | 0.84 | 0.90 | 0.87 |
| | [NH₂] (µeq/g) | 58 | 67 | 64 | 61 | 56 | 61 |
| | [COOH] (µeq/g) | 72 | 78 | 83 | 95 | 81 | 82 |
| | Phosphorus compound (wt %) | 0.105 | 0.102 | 0.101 | 0.102 | 0.104 | 0.105 |
| | Tg (° C.) | 137 | 143 | 144 | 150 | 141 | 133 |
| | Tm (° C.) | 249 | 283 | 245 | — | 246 | 242 |
| | Heat of fusion (J/g) | 21 | 30 | 6 | — | 12 | 16 |
| | Crystallization Temp. (° C.) | — | 200 | 193 | — | 212 | — |
| | YI | 2.1 | 2.0 | 2.3 | 3.3 | 2.0 | 2.4 |
| Injection molded specimen | Total light transmittance (%) | 89.1 | 89.0 | 89.4 | 86.2 | 89.4 | 88.8 |
| | YI | 2.3 | 2.1 | 2.5 | 4.5 | 2.5 | 2.6 |
| | Impact Strength (kJ/m²) | 10.5 | 10.5 | 10.8 | 9.5 | 10.7 | 10.5 |
| | External appearance | Good | Good | Good | Good | Good | Good |

| | | Example 7 | Example 8 | Example 9 | Example 10 | Example 11 | Example 12 |
|---|---|---|---|---|---|---|---|
| Composition ratio (mol %) | PACM | 50 | 100 | 100 | 100 | 100 | 100 |
| | MACM | 50 | | | | | |
| | 1,12-dodecanedioic acid | 100 | 100 | 100 | 100 | 100 | 100 |
| | 1,10-decanedioic acid | | | | | | |
| | Terephthalic acid | | | | | | |
| | 1,4-CHDA | | | | | | |
| | Adipic acid | | | | | | |
| Phosphorus compound (injection amount) | sodium hypophosphite-1 hydrate | 0.100 | 0.100 | 0.100 | 0.050 | 0.025 | 0.100 |
| Low-order condensate | Polymerization Temp. (° C.) | 210 | 230 | 210 | 210 | 210 | 210 |
| | Pressure (MPa) | 1.5 | 2.2 | 1.5 | 1.5 | 1.5 | 1.5 |
| | IV (dL/g) | 0.14 | 0.22 | 0.15 | 0.14 | 0.14 | 0.14 |
| | Melting Temp (° C.) | 255 | 256 | 242 | 241 | 240 | 241 |
| | Heat of fusion (J/g) | 7 | 36 | 42 | 45 | 43 | 45 |
| Polyamide resin | SSP Temp. (° C.) | 205 | 210 | 215 | 205 | 205 | 180 |
| | SSP time (h) | 4 | 4 | 4 | 4 | 4 | 6 |
| | IV (dL/g) | 0.80 | 1.15 | 1.02 | 0.88 | 0.90 | 0.85 |
| | [NH₂] (µeq/g) | 73 | 48 | 55 | 55 | 60 | 70 |

TABLE 1-continued

|  |  | Example 1 | Example 2 | Example 3 | Example 4 | Example 5 | Example 6 |
|---|---|---|---|---|---|---|---|
|  | [COOH] (µeq/g) | 78 | 47 | 61 | 75 | 71 | 73 |
|  | Phosphorus compound (wt %) | 0.107 | 0.103 | 0.106 | 0.049 | 0.025 | 0.102 |
|  | Tg (° C.) | 135 | 135 | 134 | 136 | 135 | 135 |
|  | Tm (° C.) | — | 250 | 255 | 250 | 249 | 250 |
|  | Heat of fusion (J/g) | — | 21 | 29 | 31 | 32 | 32 |
|  | Crystallization Temp. (° C.) | — | 190 | 198 | — | — | — |
|  | YI | 3.5 | 3.9 | 4.2 | 2.1 | 2.3 | 2 |
| Injection molded specimen | Total light transmittance (%) | 86.2 | 86.7 | 86.5 | 89.4 | 89.5 | 89.2 |
|  | YI | 4.6 | 4.8 | 4.8 | 1.9 | 2.3 | 2.0 |
|  | Impact Strength (kJ/m$^2$) | 10.8 | 10.8 | 10.8 | 10.7 | 10.8 | 10 |
|  | External appearance | Good | Good | Good | Good | Good | Good |

SSP: solid polymerization

TABLE 2

|  |  | Comparative Example 1 | Comparative Example 2 | Comparative Example 3 | Comparative Example 4 | Comparative Example 5 | Comparative Example 6 (melt) |
|---|---|---|---|---|---|---|---|
| Composition ratio (mol %) | PACM | 100 | 100 | 100 | 100 | 40 | 100 |
|  | MACM |  |  |  |  | 60 |  |
|  | 1,12-dodecanedioic acid | 100 |  | 60 | 60 | 100 | 100 |
|  | 1,10-decanedioic acid |  |  |  |  |  |  |
|  | Terephthalic acid |  |  | 40 |  |  |  |
|  | 1,4-CHDA |  |  |  | 40 |  |  |
|  | Adipic acid |  | 100 |  |  |  |  |
| Phosphorus compound (injection amount) | sodium hypophosphite-1 hydrate | 0.005 | 0.100 | 0.100 | 0.100 | 0.100 | 0.100 |
| Low-order condensate | Polymerization Temp. (° C.) | 210 | 210 | 210 | 210 | 210 | — |
|  | Pressure (MPa) | 1.5 | 1.5 | 1.5 | 1.5 | 1.5 | — |
|  | IV (dL/g) | 0.13 | 0.17 | 0.12 | 0.17 | 0.12 | — |
|  | Melting Temp (° C.) | 240 | unmeasurable | — | unmeasurable | — | — |
|  | Heat of fusion (J/g) | 45 | — | — | — | — | — |
| Polyamide resin | SSP Temp. (° C.) | 205 | 205 | 208 | 208 | 205 | — |
|  | SSP time (h) | 6 | 4 | 5 | 5 | 4 | — |
|  | IV (dL/g) | 0.86 | 0.82 | 0.72 | 0.79 | 0.73 | 1.06 |
|  | [NH$_2$] (µeq/g) | 67 | 81 | 91 | 73 | 81 | 50 |
|  | [COOH] (µeq/g) | 78 | 75 | 84 | 83 | 96 | 55 |
|  | Phosphorus compound (wt %) | 0.004 | — | — | — | — | 0.105 |
|  | Tg (° C.) | 135 | 165 | 155 | 154 | 133 | 134 |
|  | Tm (° C.) | 248 | 310 | — | 355 | — | 257 |
|  | Heat of fusion (J/g) | 32 | 55 | — | 13 | — | 33 |
|  | Crystallization Temp. (° C.) | 201 | 310 | — | 318 | — | — |
|  | YI | 5.6 | 2.6 | 6.5 | 2.8 | 8.8 | 5.2 |
| Injection molded specimen | Total light transmittance (%) | 84.8 | Molding impossible | 81.9 | Molding impossible | 82.4 | 84.5 |
|  | YI | 7.2 | — | 7.6 | — | 8.1 | 5.8 |
|  | Impact Strength (kJ/m$^2$) | 10.1 | — | 6.7 | — | 5.5 | 9.9 |
|  | External appearance | Poor | — | Poor | — | Poor | Poor |

SSP: solid polymerization,
melt: melt polymerization,
Poor: color & transparency poor As can be seen from Tables 1 and 2, the present invention can provide a polyamide resin that exhibits good properties in terms of transparency, color and impact strength.

It should be understood that various modifications, changes, alterations, and equivalent embodiments can be made by those skilled in the art without departing from the spirit and scope of the present invention.

The invention claimed is:

1. A method of preparing a polyimide resin, comprising:
preparing a low-order condensate in a solid phase through polycondensation of a dicarboxylic acid and a diamine in the presence of about 0.01 wt % to about 0.5 wt % of a phosphorus compound based on the total amount of the dicarboxylic acid and the diamine; and
solid polymerizing the low-order condensate,
wherein the dicarboxylic acid comprises about 70 mol % or more of a $C_9$ to $C_{12}$ aliphatic dicarboxylic acid based on the total amount of the dicarboxylic acid, the diamine comprises about 50 mol % or more of a diamine represented by Formula 1 based on the total amount of the diamine, the polycondensation is performed at a maximum temperature of about 200° C. to about 220° C., and the solid polymerization is performed at a maximum reaction temperature of about 170° C. to about 230° C.:

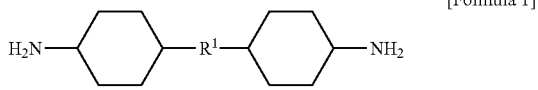

wherein $R^1$ is a $C_1$ to $C_3$ alkylene group.

2. The method of preparing a polyamide resin according to claim 1, wherein the solid polymerization is performed at a maximum reaction temperature of about 170° C. to about 210° C.

3. The method of preparing a polyamide resin according to claim 1, wherein the phosphorus compound comprises at least one-selected from the group consisting of phosphorous acid, hypophosphorous acid, and salts thereof.

4. A polyamide resin prepared through polycondensation of a dicarboxylic acid and a diamine and comprising: about 0.01 wt % to about 0.5 wt % of a phosphorus compound, herein the phosphorous compound includes at least one selected from the group consisting of phosphorous acid, hypophosphorous acid and salts thereof,
wherein the dicarboxylic acid comprises about 70 mol % or more of a $C_9$ to $C_{12}$ aliphatic dicarboxylic acid based on the total amount of the dicarboxylic acid, the diamine-comprises about 90 mol % or more of a diamine represented by Formula 1 based on the total amount of the diamine, the polyamide resin has an inherent viscosity (IV) of about 0.6 dL/g to 1.15 dL/g as measured at 25° C. and at a concentration of 0.5 g/dL in concentrated sulfuric acid, and a 4 mm thick molded article produced using the polyamide resin has a total light transmission of 88.8% or more and a yellowness index (YI) of about 5 or less:

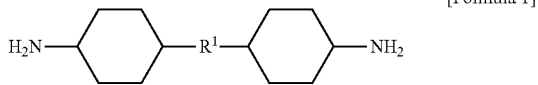

wherein $R^1$ is a $C_1$ to $C_3$ alkylene group.

5. The polyamide resin according to claim 4, wherein the dicarboxylic acid, comprises at least-one of an alicyclic dicarboxylic acid, and an aromatic dicarboxylic acid, and comprises about 70 mol % to leas than about 100 mol % of the $C_9$ to $C_{12}$ aliphatic dicarboxylic acid and higher than 0 mol % to about 30 mol % of the at least one of the alicyclic dicarboxylic acid and the aromatic dicarboxylic acid.

6. The polyamide resin according to claim 4, wherein the aliphatic dicarboxylic acid comprises at least one of sebacic acid and dodecanedioic acid.

7. The polyamide resin according to claim 4, wherein the at least one of the alicyclic dicarboxylic acid and the aromatic dicarboxylic acid comprises at least one selected from the group consisting of 1,4-cyclohexanedicarboxylic acid, terephthalic-acid, and isophthalic acid.

8. The method of preparing a polyamide resin according to claim 1, wherein the polyamide resin has a yellowness index (YI) of about 5 or less before molding.

9. The method of preparing a polyamide resin according to claim 1, wherein the polyamide resin has a yellowness index (YI) of about 4 or less before molding.

10. The method of preparing a polyamide resin according to claim 1, wherein a 4 mm thick molded article produced using the polyamide resin has a yellowness index (YI) of about 5 or less and a total light transmission of about 85% or more.

11. The method of preparing a polyamide resin according to claim 1, wherein a 4 mm thick molded article produced using the polyamide resin has a yellowness index (YI) of about 4 or less and a total light transmission of about 85% or more.

12. The method of preparing a polyamide resin according to claim 1, wherein a 4 mm thick molded article produced using the polyamide resin has a yellowness index (YI) of about 3 or less and a total light transmission of about 85% or more.

13. The polyamide resin according to claim 4, wherein the polyamide resin has a yellowness index (YI) of about 5 or less before molding.

14. The polyamide resin according to claim 4, wherein the polyamide resin has a yellowness index (YI) of about 4 or less before molding.

15. The polyamide resin according to claim 4, wherein the polyamide resin has an inherent viscosity (IV) of about 0.6 dL/g to 0.91 dL/g as measured at 25° C. and at a concentration of 0.5 g/dL in concentrated sulfuric acid and wherein a 4 mm thick molded article produced using the polyamide resin has a total light transmission of 89.0% or more.

16. The polyamide resin according to claim 4, wherein the phosphorous compound comprises at least one selected from the group consisting of salts of phosphorous acid and salts of hypophosphorous acid.

17. The polyamide resin according to claim 16, wherein the phosphorous compound comprises a salt of hypophosphorous acid.

18. The polyamide resin according to claim 15, wherein a 4 mm thick molded article produced using the polyamide resin has a yellowness index (YI) of about 3 or less.

* * * * *